US005648617A

United States Patent [19]
Cullen et al.

[11] Patent Number: 5,648,617
[45] Date of Patent: Jul. 15, 1997

[54] SINGLE AXIS ROBOT FORCE SENSOR ASSEMBLY

[75] Inventors: W. Paul Cullen, Scotia; Pamela B. Billings, Ballston Spa, both of N.Y.; John E. Ramming, Woodland, Calif.

[73] Assignee: Applied Robotics, Inc., Glenville, N.Y.

[21] Appl. No.: 519,311

[22] Filed: Aug. 25, 1995

[51] Int. Cl.$^6$ .................................................. G01L 3/00
[52] U.S. Cl. .......................... 73/862.045; 73/862.042; 73/862.627
[58] Field of Search ................ 73/862.042, 862.043, 73/862.044, 862.045, 862.046, 862.627

[56] References Cited

U.S. PATENT DOCUMENTS

| | | | |
|---|---|---|---|
| 3,960,013 | 6/1976 | Ormond | 73/141 A |
| 4,483,203 | 11/1984 | Capper | 73/862.044 |
| 4,488,441 | 12/1984 | Ramming | 73/862.04 |
| 4,521,685 | 6/1985 | Rebman | 250/229 |
| 4,573,362 | 3/1986 | Amlani | 73/862.045 |
| 4,577,513 | 3/1986 | Harwood et al. | 73/862.045 |
| 4,640,137 | 2/1987 | Trull et al. | 73/862.04 |
| 4,763,531 | 8/1988 | Dieterich et al. | 73/862.044 |
| 4,823,618 | 4/1989 | Ramming | 73/862.04 |
| 4,849,730 | 7/1989 | Izumi et al. | 73/862.044 |
| 5,571,972 | 11/1996 | Okada | 73/862.043 |

FOREIGN PATENT DOCUMENTS

| | | | |
|---|---|---|---|
| 2.135.461 | 12/1972 | France | G01L 1/00 |
| 29 24 503 A1 | 1/1981 | Germany | G01L 1/22 |
| 30 12 984 A1 | 10/1981 | Germany | G01L 1/22 |
| 38 37 683 A1 | 5/1990 | Germany | G01L 1/22 |
| WO82/02163 | 7/1982 | WIPO | G01L 5/00 |

*Primary Examiner*—Richard Chilcot
*Assistant Examiner*—Ronald Biegel
*Attorney, Agent, or Firm*—Heslin & Rothenberg, P.C.

[57] ABSTRACT

A single axis force sensor assembly for sensing compressive and tensile forces along a first axis includes a first member having a center hub and a plurality of arms extending radially outward therefrom. Each of the plurality of arms terminate at a peripheral flange of the first member. Strain sensing gauges are mounted to at least one of the plurality of arms so as to detect mechanical deformation of the arm or arms to which the gauges are attached. A second member is joined to the center hub such that the first and second members are oriented generally parallel to one another. A gap extends between the first member and the second member. A circuit carrying substrate may be physically incorporated as a part of the force sensor assembly, i.e., above and adjacent to the plurality of arms. A circuit of the circuit carrying substrate is electrically connected to the strain sensing gauges. A recessed ledge may be formed at an inner periphery of the peripheral flange of the first member for facilitating placement and positioning of the substrate adjacent to—without touching—the plurality of arms. A channel may be formed radially through the peripheral flange of the first member for accessing an adjustable switch which may be mounted to the circuit carrying substrate.

19 Claims, 4 Drawing Sheets

SINGLE AXIS ROBOT FORCE SENSOR ASSEMBLY

BACKGROUND OF THE INVENTION

1. Technical Field

The present invention generally relates to force sensing systems. More particularly, the present invention relates to force sensor assemblies used in robotic applications. Even more particularly, the present invention relates to single axis robot force sensor assemblies having the capability of sensing compressive and tensile forces associated with robotic applications.

2. Background Information

A problem associated with robot technology today is the lack of simple and compact robot force sensing systems, which after detecting one or more predetermined forces associated with a robot's motion, have the capability of directing the robot to perform alternative motions or tasks. Another problem is the lack of devices which permit a user the opportunity to simply adjust the sensitivity of the forces desired to be detected. These problems are especially prevalent in sensing compressive and tensile forces along a single axis.

While conventional load cells have been used in the past for sensing single axis forces in robotic applications, such devices are typically cumbersome and complex. Moreover, conventional load cell devices and other force sensing devices do not have circuitry which is physically incorporated as part of the devices. Furthermore, conventional load cells do not have the ability to adjust the sensitivity of the forces desired to be sensed. As a result, the commercial incorporation of conventional load cells into robotic machinery for sensing single axis compressive and tensile forces is not feasible.

There also exist multiple axis force sensing devices, which not only measure axial forces, but also measure moment forces associated with robotic applications. However, these devices are typically complex, requiring sophisticated electronic circuitry to be physically separated from the force sensor assembly. Also, multiple axis force sensing devices generate a data stream of information, most of which is not needed in sensing only compressive and tensile forces along a single axis. Because of their complexity and size (and expense), it is not feasible or commercially sensible to employ such devices for detecting only single axis compressive and tensile forces.

Also, most commercially available robots include emergency overload detection systems (e.g., servo error) which shut down the robot upon reaching an overload condition, i.e., when the system surpasses a pre-determined threshold force. However, presently existing overload systems are limited in their applications because of a lack of sensitivity in detecting small forces. Typically, emergency overload detection systems shut down the system upon sensing a large force. Also, these systems do not permit the robot to perform an alternate motion or task upon reaching the overload condition. Once the overload condition is detected, the robot automatically shuts down and it is thereafter necessary for an operator to clear the error on the robot control system. At times, it may be necessary for the operator to physically remove an obstruction which caused the overload condition. Once the overload condition is corrected, the operator may then re-start operation of the robot. This procedure, however, is timely and costly.

Until now, there have been no known force sensor assemblies which may be easily and simply incorporated and packaged for use with robotic machinery for sensing devices along a single axis.

The present invention was the result of the recognition of a need in the robotic industry for a single axis force sensor which senses compressive or tensile forces along a single axis, and in response to sensing a predetermined force, signals the robot controller to direct the robot to perform an alternate motion or task. The structure of the present invention contains a solution to the aforementioned problems.

SUMMARY OF THE INVENTION

Briefly, the present invention satisfies this need and overcomes the shortcomings of the prior art through the provision of a single axis robot force sensor assembly for use in sensing forces associated with robotic applications. The assembly of the present invention includes a center hub which joins a first member to a second member. A plurality of arm members, i.e., flexing members, extend radially outward from the center hub and terminate in a peripheral flange or rim of the first member. In the preferred embodiment, the peripheral flange resembles a ring. Both the first and second members, oriented generally parallel to one another, may be spaced apart such that a gap is formed therebetween. Strain sensing means, preferably strain gauges, are mounted to at least one of the plurality of arm members for gauging mechanical deformation of the arm member. A circuit carrying substrate may be physically incorporatable as part of the force sensor assembly, e.g., adjacent the arms, and a circuit of the circuit carrying substrate may be electrically connected to the strain sensing means.

Preferably, a recessed ledge is formed at an inner periphery of the peripheral flange of the first member for facilitating placement and positioning of the substrate adjacent to, without touching, the plurality of arms. A channel may be formed radially through the peripheral flange of the first member for accessing an adjustable switch which is mounted to the circuit carrying substrate. When the circuit carrying substrate is physically incorporated as a part of the assembly, the adjustable switch is aligned adjacent to the channel so that the adjustable switch may be manually accessible therethrough. Also, a port hole preferably extends radially through the peripheral flange of the first member for viewing an indicator, e.g., a light emitting diode, which is attached to the substrate. When the substrate is incorporated as a part of the assembly, the indicator is aligned adjacent to the port hole for facilitating viewing of the indicator. When the LED is activated, visible light passes through the port hole.

In another aspect of the present invention, tensile and compressive overload stops may be incorporated into the assembly for preventing structural damage to the assembly associated with excessive compressive and tensile forces.

It is therefore a primary object of the present invention to provide a force sensor assembly for sensing compressive and tensile forces along a single axis, for use with robotic machinery.

It is another object of the present invention to provide a force sensor assembly for robotic machinery which is simply designed and engineered for ease of installation, use and operation.

It is another object of the present invention to provide a robot force sensor assembly which is compactly designed and engineered, having minimal height and weight, which can be used in an entire array of robotic applications.

It is yet another object of the present invention to provide a robot force sensor assembly which accurately detects specific forces, both positive and negative, along a single axis, and permits alternate action or motion to be made in response to the detection of the specific forces.

It is still another object of the present invention to provide a robot force sensor assembly which is highly accurate but inexpensive to manufacture.

It is another object of the present invention to provide a force sensor assembly which physically incorporates and packages as part of the assembly the electronic circuitry for sensing predetermined forces.

It is another object of the present invention to provide a force sensor assembly for robotic applications which permits a manual adjustment feature for setting predetermined forces desired for detection in a particular application.

It is still another object of the present invention to incorporate on/off switches in the design of the force sensor assembly for facilitating sensing of the predetermined compressive and tensile forces.

BRIEF DESCRIPTION OF THE DRAWINGS

The subject matter which is regarded as the present invention is particularly pointed out and distinctly claimed in the concluding portion of the specification. The invention, however, both as to organization and method of practice, together with the further objects and advantages thereof, may be best understood by reference to the following detailed description taken in conjunction with the accompanying drawings, in which:

DETAILED DESCRIPTION OF THE INVENTION

It will be readily apparent that the components of the present invention, as generally described and illustrated in the figures, could be arranged and designed in a wide variety of different configurations. Thus, the following detailed description of the single axis robot force sensor assembly of the present invention, as represented in FIGS. 1-7, is not intended to limit the scope of the invention, as claimed, but is merely representative of the presently preferred embodiments of the invention. The presently preferred embodiments of the invention will be best understood by reference to the drawings, where like parts are designated with like numerals.

Figure 1:
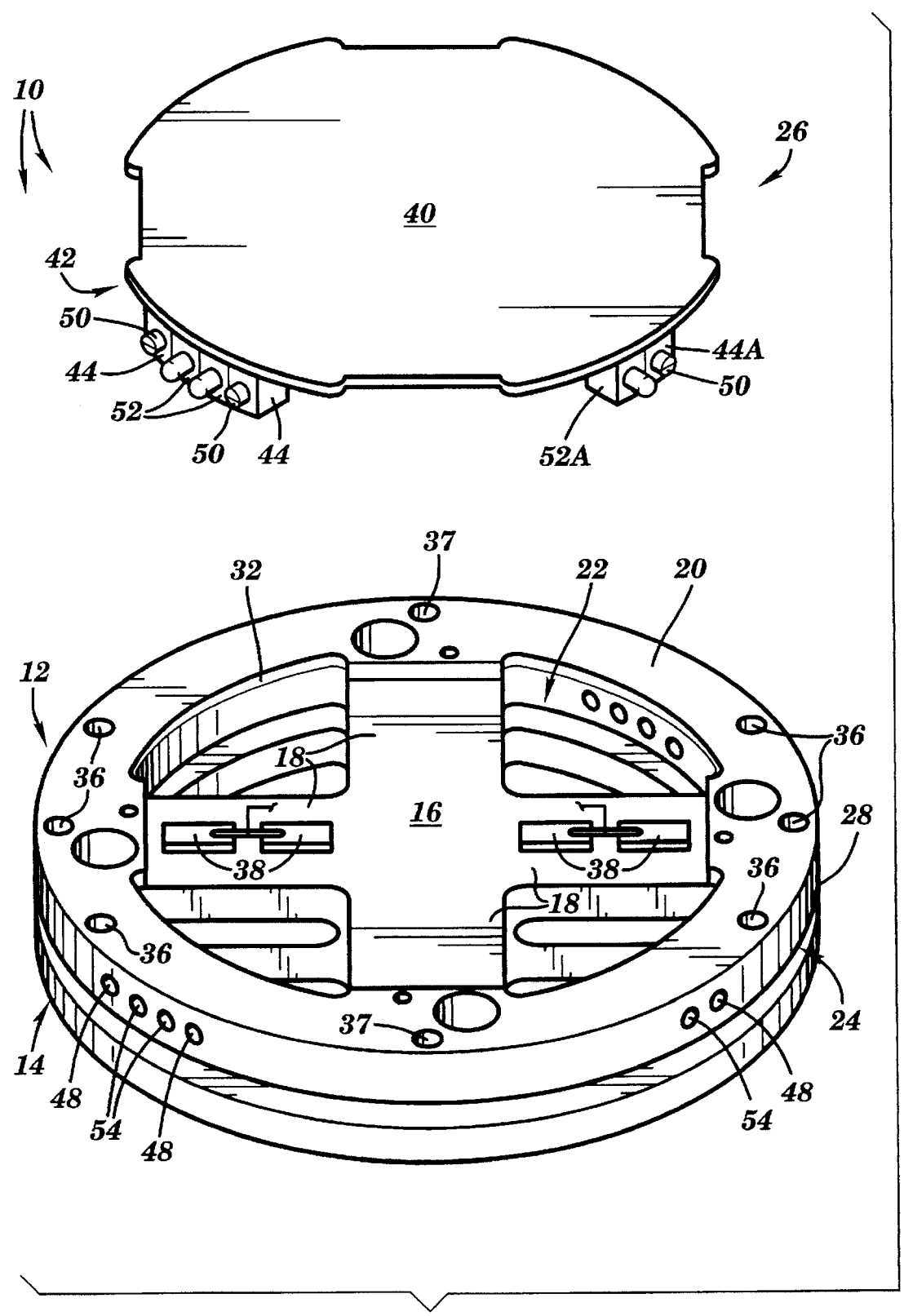
FIG. 1 is a perspective view of a single axis robot force sensor assembly constructed in accordance with the principles of the present invention.

In reference to the drawings, and more particularly to FIG. 1, there is shown in accordance with the present invention one embodiment of the robot force sensor assembly 10. In the preferred embodiment, force sensor assembly 10 includes a first member 12 and a second member 14. Both first member 12 and second member 14 may be joined or coupled together via a center hub 16. Center hub 16 of assembly 10 may include a plurality of arms 18, i.e., flexing members, extending radially outward therefrom and terminating at a peripheral flange 20 or rim of first member 12. A sectional opening 22 may be formed between successive arms 18. First member 12 and second member 14 are preferably oriented generally parallel to one another with a gap 24 extending therebetween. A circuit carrying substrate 26 may be physically incorporated as a part of force sensor assembly 10, i.e., adjacent to arms 18.

Figure 2:
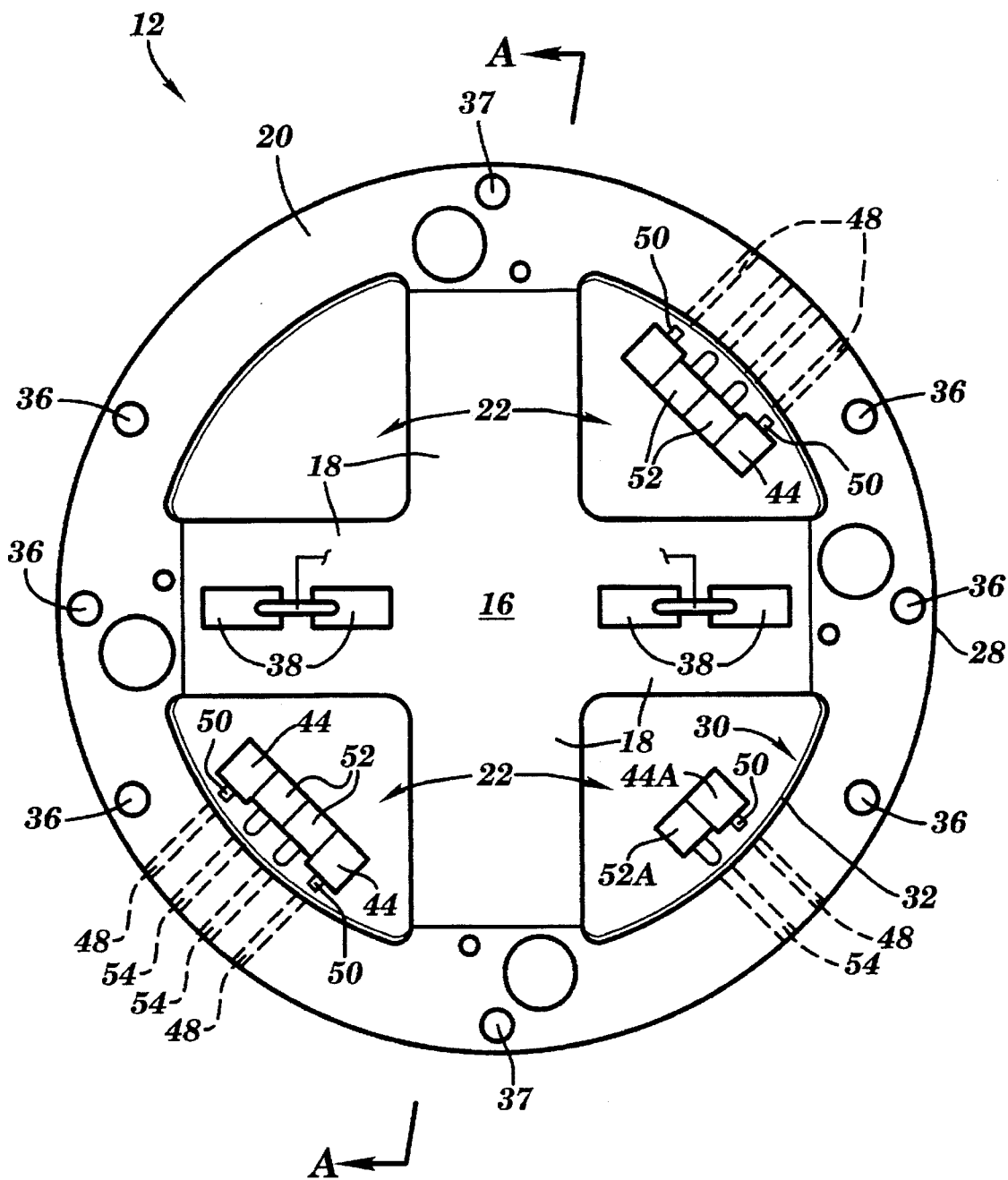
FIG. 2 is a plan view of an external face of a first member of the robot force sensor assembly shown in FIG. 1, having a number of electronic components illustrated therein.
Figure 3:
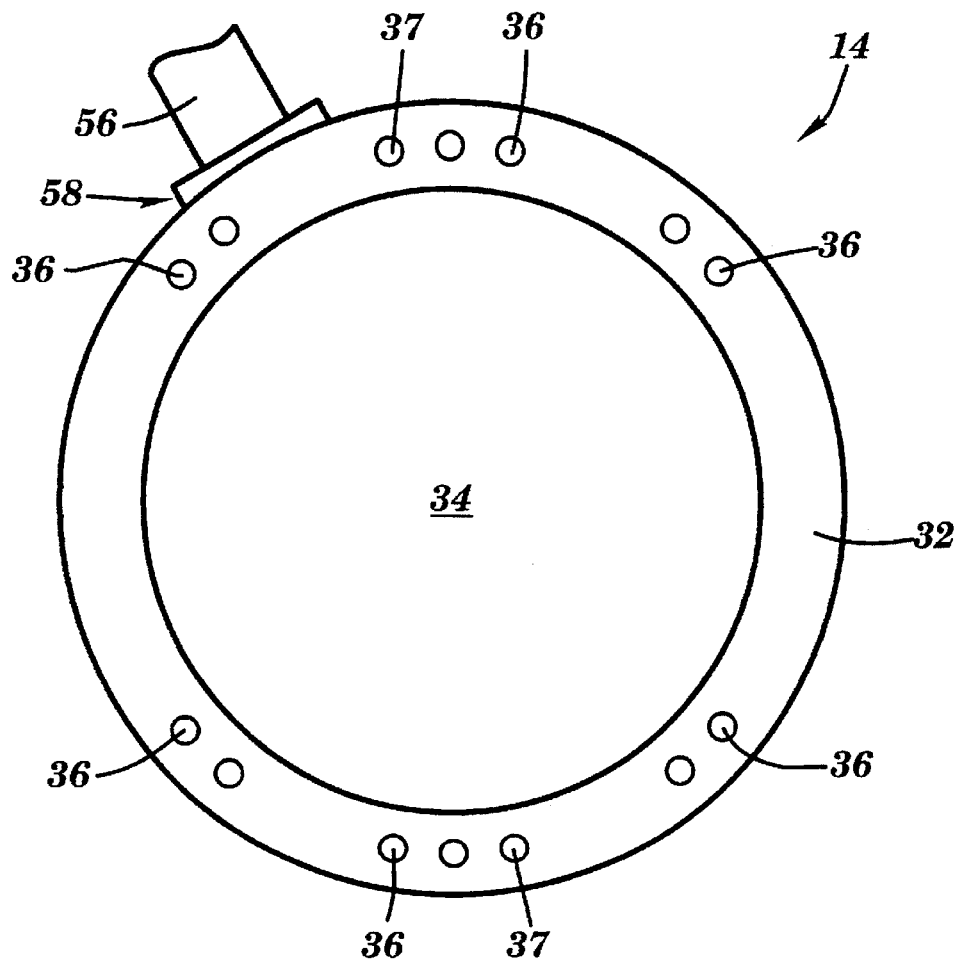
FIG. 3 is a plan view of an external face of a second member of the robot force sensor assembly shown in FIG. 1.

In reference now to both FIGS. 1 & 2, first member 12 is preferably shaped like a plate or disk, having peripheral flange 20 at its outermost boundary. Peripheral flange 20 may be configured to resemble a ring-like structure. As viewed from the top in FIG. 2, first member 12 is preferably circular in cross-section. It should be understood, however, that while a circular cross-sectional construction is preferred, other shapes may be equally satisfactory. For instance, under some circumstances, it may be desirable to have a square shaped construction. Peripheral flange 20 includes an outer edge 28 and an inner periphery 30. A recessed ledge 32 may be formed circumferentially around inner periphery 30 for retention of circuit carrying substrate 26 once physically incorporated as a part of force sensor assembly 10.

Second member 14 is preferably configured in the same shape as first member 12, having a disk-like or plate-like shape. By contrast, however, second member 14 has a contiguous or homogenous formation without sectional openings formed therein. Preferably, second member 14 has a thickness which is slightly less than that of first member 12. Second member 14 is preferably joined generally parallel to first member 12 with gap 24 extending between the two members. In maintaining as best as possible a consistent load path between second member 14 and an attached robot face plate, the external face of second member 14 may include a raised perimeter 32 (see FIG. 3), and a central depressed area 34, which is intended to offset any deformities which may be present on the surface to which second member 14 mates.

Typically, the external face of second member 14 will be removably secured or fastened to a face plate (not shown) of a robot. Similarly, the external face of first member 12 is removably attached to an end of arm tooling (not shown). In order to facilitate the removable attachment of force sensor assembly 10 to the robot face plate and end of arm tooling, both the external faces of first member 12 and second member 14 include mechanical attachment means, such as conventional mounting holes 36.

Figure 4:
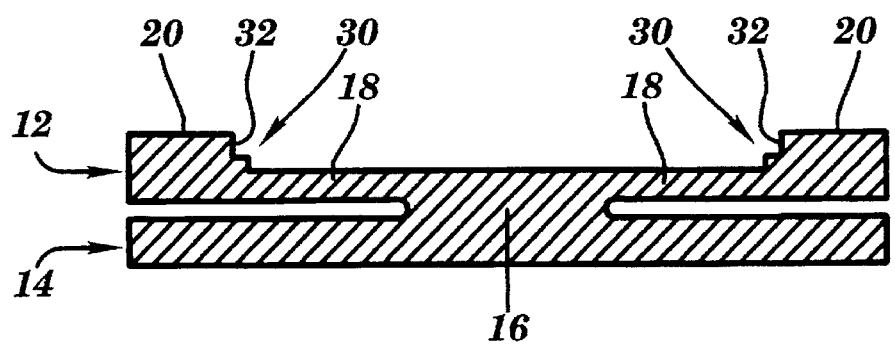
FIG. 4 is a side sectional view, taken along lines A—A of FIG. 2, illustrating the relationship between the first member and the second member of the robot force sensor assembly of FIGS. 1-3.

During operation, the robot tool may be oriented in nearly any direction. However, the most common orientation is where the robot tool is angled towards the floor or ground (at least partially vertically downward). It should be emphasized that in the preferred embodiment, the external face of first member 12 attaches to the end of arm tooling and the external face of second member 14 attaches to the robot face plate. In the most common orientation, therefore, the external face of first member 12 will be angled at least partially vertically downward and the external face of second end 14 will be positioned at least partially vertically upward. Therefore, the inverted orientation of assembly 10, as shown in FIGS. 1 and 4, with the external face of first member 12 facing vertically upward and the external face of second member 14 facing vertically downward, is shown only for clarity of presentation, and is not representative of the orientation of the assembly 10 after being attached to the robot face plate and tooling end of arm.

Center hub 16 is a centrally disposed post which rigidly joins together first member 12 and second member 14. FIG. 4, a partial cross-sectional view of the force sensor assembly 10 of the present invention, illustrates the structural relationship between center hub 16, arms 18, first member 12 and second member 14. While the structure of these elements are all preferably formed integral or homogenous to one another, mechanical and/or chemical means of fastening may alternatively be employed to connect the various structural elements together. For example, second member 14 may be attached to hub 16 by welding or chemical bonding.

Arms 18 extend radially outward from center hub 16 and terminate at peripheral flange 20. The external face of each arm 18 is preferably disposed below recessed ledge 32 so that when circuit carrying substrate 26 is incorporated as part of assembly 10, adjacent to arms 18, a clearance between the substrate 26 and arms 18 is created, thereby preventing contact of the two elements. As shown in FIGS. 1-2, the preferred embodiment contemplates four arms 18 oriented in ninety degree relation to one another. It should be noted, however, that the present invention should not be limited in any way to four arms 18 in ninety degree relation. Instead, the number of arms extending radially outward from center hub 16 may vary depending on the particular application for which the force sensor assembly is to be employed. For example, in lieu of four arms oriented in 90 degree relation, two arms, in 180 degree relation to one another, or three arms, in 120 degree relation to each other, may be desirable and equally satisfactory. However, from the standpoint of structural stability, four arms are preferred.

In one aspect of the present invention, arms 18 are designed to deform or deflect in response to compressive and tensile forces associated with the motion of the robot. Therefore, each arm preferably has a flexing or elastic characteristic. Because of the flexible or elastic nature of arms 18, they are often referred to in the art as "flexures." As will be described more fully hereinafter, it is the deflection or bending characteristic of arms 18 which facilitates the sensing of the compressive and tensile forces associated with the motion of the robot.

It should also be made clear that the present invention is not limited in any way to the elongate radial flexing arms 18 as described herein. Instead, other structural shapes and configurations may be equally good so long as the shape chosen permits deformation which can be measured using known techniques. Furthermore, while the preferred embodiment describes center hub 16 as the joining point for first member 12 and second member 14, it should be understood that the first and second members may be joined in another manner, e.g., joined together at the periphery of the members.

Each flexing arm 18 may include known strain sensing means mounted thereon for sensing the mechanical deformation caused by a tensile or compressive force applied to the force sensor assembly 10. Upon application of a compressive force to assembly 10, first member 12, including arms, will tend to deflect or deform towards second member 14. On the other hand, if a tensile force is encountered, first member 12 will tend to deflect or deform away from second member 14. In the preferred embodiment, known strain gauges 38 (see FIG. 1), i.e., resistive elements, are employed to sense the deformation caused by the compressive and/or tensile forces.

As the arms 18 deform because of the application of a compressive or tensile force, the attached strain gauges 38 will also deform. Consequently, if a tensile force is encountered, the length of the strain gauge will become longer. As the length of a strain gauge is changed, its resistance changes. Based on the change in resistance, a force can be electronically sensed by the circuitry located on circuit carrying substrate 26. Preferably, a known circuit such as a Wheatstone Bridge is employed for accomplishing the detection of compressive and tensile forces associated with the robot's motion.

In the preferred embodiment, as illustrated in FIGS. 1 and 2, a pair of strain gauges 38 are mounted to two of the four arms 18. Preferably, the two arms selected for mounting strain gauges 38 thereon are in 180 degree relationship to one another. Additional strain gauges may be employed in the present invention, depending on the accuracy sought in measuring the deformation of the flexures.

Strain gauges 38 are mounted to arms 18 using known techniques in the art. In the preferred embodiment, strain gauges should be positioned equidistant from the center point of hub 16. Such equidistant positioning of strain gauges is preferred so that when a compressive force is applied to one arm 18 and a tensile force is simultaneously applied to the opposite arm 18, the circuitry of the force sensor assembly may perform a known additive function so that pure compressive and tensile forces along a first axis are sensed.

Sectional openings 22 are formed between successive or adjacent arms 18. Preferably, there are four sectional openings 22 separating the four arms 18. Each opening 18 is pie-shaped and provides an open space or area so that when circuit carrying substrate 26 is incorporated as part of the assembly 10, i.e., adjacent to arms 18 and retained by ledge 32, the various bulky electronic components located on the substrate 26 may be accurately positioned within sectional openings 22. As will be described hereinafter, peripheral flange 20 of first member 12 may be formed with numerous apertures passing radially therethrough for alignment to these electronic components located on the substrate.

As can be seen in FIG. 1, circuit carrying substrate 26 is shaped for physical incorporation as a part of assembly 10, i.e., next to arms 18 and retained by ledge 32. In one aspect of the invention, it is the "on-board" packaging of the electronics onto the assembly which provides the present invention with numerous functional advantages, e.g., ease of installation, use and operation. Accordingly, the design and shape of substrate 26 should correspond for fitting to ledge 32 of inner periphery 30. Preferably, upon physical incorporation of substrate 26 adjacent to arms 18, the circuitry of substrate 26 should not mechanically contact or touch arms 18. Accordingly, in order to prevent such contact, a small clearance between the circuit carrying substrate 26 and arms 18 may be provided.

Circuit carrying substrate 26 includes an outer face 40 and an inner face 42. It is on inner face 42 to which the electronic components and circuitry of the present invention are preferably located. Therefore, when inner face 42 is incorporated as a part of assembly 10, the inner face of the substrate faces arms 18. Recessed ledge 32 provides the means for retaining substrate 26 in a proper position when physically incorporated next to arms 18. In order to secure substrate 26 above arms 18, any known securing means may be employed, but preferably a bonding glue is used.

Each strain gauge 38 is electrically coupled to the circuitry located on substrate 26. Through the circuitry, each strain gauge 38 may be coupled to a corresponding adjustable switch 44, which may be manually adjusted for sensing different forces. As known in the art, the preferred adjustable switching mechanism are known as "trim pots." In the preferred embodiment of the present invention, there are a total of five adjustable switches—a static switch, i.e., a zeroing switch 44A, two compressive switches and two tensile switches. However, it should be noted that additional or fewer adjustable switches 44 may be incorporated into the force sensor assembly, depending on the number of forces which one desires to detect.

In order to compensate for the effect of gravity on the robotic machinery when the force sensor assembly 10 is mounted to a robot face plate and end of tooling, zeroing switch 44A is employed. After adjusting to a "zero state", a signal is sent to the controller 46—indicating that the system is normally tooled and ready for programmed movement. Once the static condition is set, all predetermined compressive forces and tensile forces may be measured from this zero threshold.

In reference back to FIG. 2, each switch 44 may be manually adjusted to sense a predetermined force, either compressive or tensile. Each switch 44 includes a screw head 50 so that manual adjustment may be easily and simply accomplished. To facilitate manual adjustment of the adjustable switches, a plurality of corresponding channels 48 may extend radially through peripheral flange 20 from a point on the outer edge 28 to the inner periphery 30 thereof. All of the adjustable switches 44 are preferably mounted to the circuit carrying substrate 26 along the periphery thereof so as to facilitate alignment to the corresponding channels 48. Each channel 48 is designed so that when circuit carrying substrate 26 is physically incorporated as a part of assembly 10, adjacent to arms 18, each adjustable switch 44 is aligned in a corresponding channel 48 at the inner periphery. By aligning each adjustable switch 44 to a corresponding channel 48, each switch 44 may be accessed through channel 48 from outside of assembly 10. By using an ordinary tool, such as a screwdriver, an operator may easily access and adjust each screw head 50 coupled to each switch 44 through the plurality of channels 48.

Upon encountering a force, the change in resistance of the strain gauges permits the force being applied to the assembly to be sensed by the electronic circuitry located on substrate 26. If the force sensed is equal to or exceeds one of the predetermined forces set by the adjustable switches, the circuit closes, and a signal may be sent to an indicator for viewing by an operator and/or to the robot controller for an alternate action. Therefore, in one aspect of the present invention, the force sensor assembly 10 incorporates a plurality of switch closures for sensing "on/off" states of switches. Once the switch is closed, i.e, the circuit completed, a signal may be sent to the controller indicating an "on" or "go" state. In response to the "go" signal sent to the robot controller, the controller may direct the robot to perform an alternative motion or task. However, if the switch is not closed, the circuit remains open, and there is an "off" or "no go" state, and no signal is sent to the controller.

In order to permit the operator to monitor the sensing of predetermined forces, each switch 44 may be electrically coupled to a corresponding indicator, such as a light emitting diode (LED) 52. Each LED 52 serves the function of providing a visual display to the operator or other person that a predetermined force has been reached. For example, upon achieving a static condition for the assembly, the corresponding LED 52A (See FIG. 2) will emit visible light, thereby notifying the operator that the static condition has been reached, and therefore, that the remaining adjustable switches may be set to the desired force limits.

A plurality of indicator port holes 54 may extend radially through peripheral flange 20 from a point on outer edge 28 to inner periphery 30. Like channels 48, each port hole 54 is designed so that when circuit carrying substrate 26 is physically incorporated as a part of sensor assembly 10, adjacent to arms 18, each LED 52 may be aligned to a corresponding port hole 54. By aligning each LED 52 to a corresponding port hole 54, the emission of visible light by the LED 52 will project through the extent of port hole 54 to the outer edge 28 of first member 12 for viewing from outside of assembly 10. In order to prevent dirt and debris from entering port holes 54, but still permit the transmission or projection of visible light therethrough, a clear bonding agent may introduced into each port hole.

It should be noted that FIG. 2 illustrates various electronic components, i.e., indicators 52 and adjustable limit switches 44, which would typically be physically attached to substrate 26. For clarity of presentation, however, the substrate 26 is not shown physically a part of assembly 10 in FIG. 2.

While in the preferred embodiment of the present invention, the indicator comprises an LED 52, other indicators may be employed, for example, a liquid crystal display (LCD), an audible tone emitter, or any other mechanical means.

An electrical cable 56 (see FIG. 3) may be attached to a conventional connector assembly 58 formed in second member 14. Alternatively, the connector assembly may be formed on first member 12. Electrical cable 56 is coupled to the circuitry located on circuit carrying substrate 26, and provides the means of transmitting the signals to the controller. Once the controller receives a particular signal about a load being experienced on force sensor assembly 10, an alternative motion or task may be transmitted to the robot.

Figure 5:
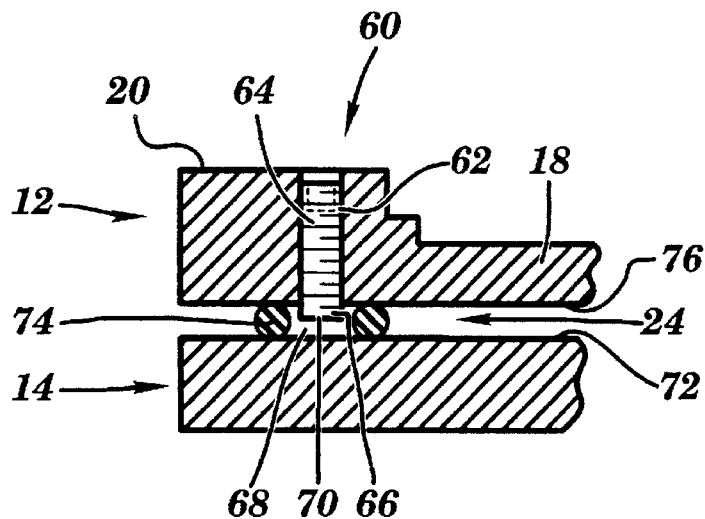
FIG. 5 is a partial side sectional view showing a compressive overload protection feature constructed in accordance with the principles of the present invention.

FIG. 5 illustrates a means for preventing a compressive overload from causing structural damage to force sensor assembly 10. First member 12 is oriented parallel to second member 14, gap 24 extending therebetween. In detecting the compressive forces associated with the robot's motion, arms 18 of first member 12 will tend to deform in response to either a compressive or tensile force.

In order to prevent structural damage due to excessive compressive loads or forces associated with robot motion, a compressive overload stop 60 may be employed in the design of assembly 10. Compressive overload stop 60 may include a threaded aperture 62 passing through first member 12 in a direction parallel to the central axes of the first and second members. A corresponding screw 64 may be threaded to threaded aperture 62. A terminal end 66 of screw 64 protrudes into gap 24 in such a way that an interspace 68 is created between the face of the terminal end 70 of screw 64 and the inner face 72 of second member 14.

Upon the application of a compressive force, flexible arms 18 will deform such that peripheral flange 20 of first member 12, including arms 18, will be deflected or deformed towards second member 14. In the event that the compressive force is excessive, the terminal end 70 of screw 64 will contact the inner face 72 of second member 12. Therefore, the maximum deflection of peripheral flange 20 of first member 12 will be the distance as represented by interspace 68.

In order to prevent dirt and any other type of debris from entering gap 24 and interfering with the operation of compressive overload stop 60, an o-ring 74 circumferentially surrounds the portion of screw 64 which extends into gap 24. O-ring 74 is configured such that it touches both inner faces 76, 72 of first and second members, respectively. However, o-ring 74 should be configured such that it does not have any influence upon the sensing of the compressive and tensile forces.

Figure 6:
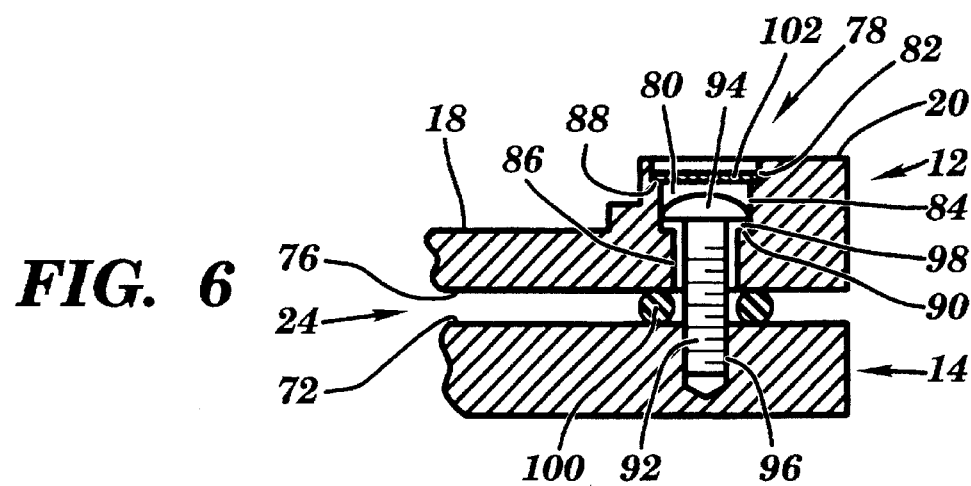
FIG. 6 is a partial side sectional view showing a tensile overload protection feature constructed in accordance with the principles of the present invention.
Figure 7:
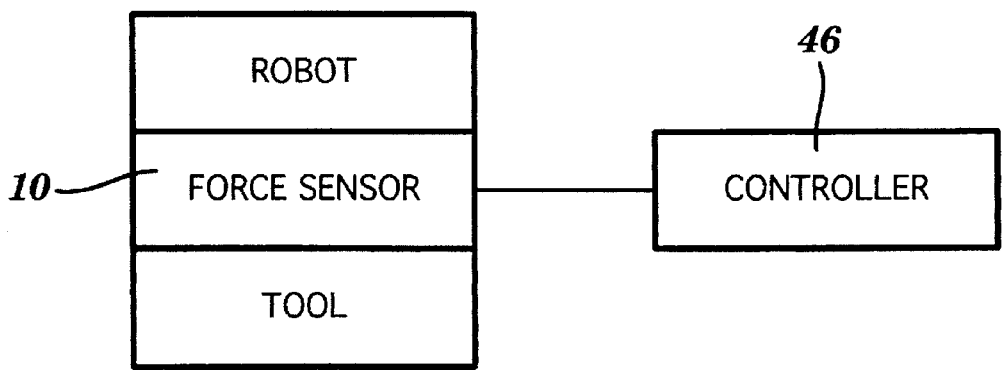
FIG. 7 is a block diagram illustrating the relationship of the robot force sensor assembly with a robot, tool and controller.

FIG. 6 illustrates a means for preventing a tensile overload on force sensor assembly 10. In sensing tensile forces associated with a robot's motion, first member 12, including arms 18, will tend to deform and deflect away from second member 14. Because of the potential for structural damage due to an overload tensile force, the present invention may include a tensile overload stop 78. Tensile overload stop 78 includes an aperture 80 formed through peripheral flange 20, in a direction parallel to the center axes of first and second members 12, 14. In the preferred embodiment, aperture 80 includes a plurality of sections, i.e., a first section 82, a second section 84, and a third section 86, each of which have different diameters. A first ledge 88 separates first section 82 from second section 84, and a second ledge 90 separates second section 84 from third section 86.

Aperture 80 is configured for accommodating a screw 92 therethrough. Screw 92 includes a cap 94 which is adapted for insertion into and retention in second section 84 of aperture 80. A plug 102 may be employed to cover aperture 80 to prevent tampering. Second member 14 includes a threaded hole 96, extending in a direction parallel to the central axes of first and second members 12, 14 and aligned coaxial with aperture 80 of first member 12. The central portion of the threaded portion of screw 92 extends into gap 24. The terminal end of screw 92 may be threadably inserted into threaded hole 96 of second member 14. Screw 92 is threaded to hole 96 such that an interval 98 remains between the underside of cap 94 and second ledge 90.

During a pulling or tensile motion, first member, including flange 20 and arms 18, will tend to deform and deflect away from second member 14. However, once peripheral flange 20 deflects the distance represented by interval 98, first member is restrained from any further movement, thereby preventing structural damage to assembly 10.

In order to prevent dirt and other debris from entering into gap 24 and interfering with the proper operation of tensile overload stop 78, an o-ring 100 may be inserted into gap 24, circumferentially surrounding the central portion of the threaded portion of screw 92. In order to effectively keep dirt and debris from entering gap 24, o-ring 100 is configured such that it touches both inner faces 76, 72 of first and second members, respectively. However, o-ring 100 should have structural characteristic which do not interfere with sensing of forces by force assembly 10.

In order to facilitate proper alignment and orientation of the force sensor assembly 10 to the robot face plate, the external face of peripheral flange 20 of first member 12 may include alignment means, such as one or more alignment holes 37 shown in FIGS. 1–2. Each of these alignment holes 37 correspond to a dowel (not shown) located on the robot face plate. Likewise, a plurality of alignment holes 37 may be formed on the external face of the second member 14 for facilitating alignment and orientation to a corresponding number of dowels located on the end of arm tooling.

While several aspects of the present invention have been described and depicted herein, alternative aspects may be effected by those skilled in the art to accomplish the same objectives. For example, while the cross-sectional configuration of first member and second member is preferably circular, other configurations may be equally desirable. For example, it may be desirable to have a square shaped configuration. Also, the preferred strain sensing means of the present invention comprises strain gauges. However, it should be known that other strain sensing means may be equally satisfactory, including distance measuring devices. Finally, while the preferred embodiment describes radial arms as the flexing members for the force sensor assembly of the present invention, other flexing members, having different structures, may be selected. Accordingly, it is intended by the appended claims to cover all such alternative aspects as fall within the true spirit and scope of the invention.

What is claimed:

1. A robotic force sensor assembly for sensing forces along a first axis, said force sensor assembly comprising:

a first member having a center hub and a plurality of arms extending radially outward therefrom, said plurality of arms terminating at a peripheral rim of said first member;

strain sensing means mounted to at least one of said plurality of arms so as to detect mechanical deformation of said at least one of said plurality of arms;

a second member joined to said center hub, said first and second members being oriented generally parallel to one another;

a gap extending between said first member and said second member;

a circuit carrying substrate physically incorporatable as part of said force sensor assembly, a circuit of said circuit carrying substrate being electrically connected to said strain sensing means;

a channel formed radially through said peripheral rim of said first member; and said circuit carrying substrate including an adjustable switch, wherein when said circuit carrying substrate is physically incorporated as a part of said force sensor assembly, said adjustable switch is aligned adjacent to said channel so that said adjustable switch is accessible therethrough.

2. The force sensor assembly of claim 1, further comprising a recessed ledge formed at an inner periphery of said peripheral flange of said first member, said recessed ledge facilitating placement of said circuit carrying substrate adjacent to said plurality of arms.

3. The force sensor assembly of claim 1, further comprising a port hole extending radially through said peripheral flange of said first member for viewing an indicator through said port hole.

4. The force sensor assembly of claim 3, wherein said circuit carrying substrate includes said indicator, wherein when said circuit carrying substrate is physically incorporated as a part of said force sensor assembly, said indicator is aligned adjacent to said port hole for facilitating viewing of said indicator.

5. The force sensor assembly of claim 4, wherein said indicator is a light emitting diode, wherein when said light emitting diode is activated, visible light passes through said port hole.

6. The force sensor assembly of claim 1, further comprising means for aligning said force sensor assembly to robot tooling and to a robot.

7. The force sensor assembly of claim 6, further comprising means for attaching said force sensor assembly to said robot tooling and said robot.

8. The force sensor assembly of claim 1, further comprising means for preventing a tensile overload.

9. The force sensor assembly of claim 1, further comprising means for preventing a compressive overload.

10. The force sensor assembly of claim 1, further comprising a connector for electrically connecting the circuit of said circuit carrying substrate to a controller.

11. The force sensor assembly of claim 10, further comprising an opening extending from a peripheral point on an outer wall of said second member, said connector being mounted to said opening at said peripheral point.

12. The force sensor assembly of claim 10, further comprising an opening extending radially from a peripheral point on said peripheral flange of said first member therethrough, said connector being mounted to said radial opening at said peripheral point.

13. A single axis robot force sensor assembly for use in sensing forces associated with robotic applications, said robot force sensor assembly comprising:

a center hub securing a first disc-like member to a second disc-like member;

said first disc-like member having a plurality of arm members extending radially outward from said center hub and terminating in a peripheral rim of said first disc-like member;

said first and second disc-like members being spaced apart so as to form a gap therebetween;

strain sensing means mounted to at least one of said plurality of arm members for gauging mechanical deformation of said at least one of said plurality of arm members; and a circuit carrying substrate physically contacting said first disc-like member, a circuit of said circuit carrying substrate being electrically connected to said strain sensing means;

wherein said circuit carrying substrate includes at least one adjustable switch mounted thereto, said at least one adjustable switch being electrically connected to said strain sensing means.

14. The robot force sensor assembly of claim 13, wherein said circuit carrying substrate includes at least one light emitting diode mounted thereto for indicating when a predetermined force has been detected.

15. The robot force sensor assembly of claim 14, further comprising a tensile overload stop.

16. The robot force sensor assembly of claim 15, further comprising a compressive overload stop.

17. A robot force sensor assembly for sensing compressive and tensile forces along a first axis, said robot force sensor assembly comprising:

first plate-like member joined to a second plate-like member at a first location;

at least one flexing member attached to one of said first plate-like member and said second plate-like member, said at least one flexing member being mechanically deformable in response to the compressive and tensile forces;

strain sensing means mounted to said at least one flexing member for gauging said mechanical deformation of said flexing member;

a circuit board physically incorporatable as part of said force sensor assembly, a circuit of said circuit board being electrically connected to said strain sensing means; and a plurality of adjustable switches mechanically incorporated on said circuit board and electrically connected to a circuit of said circuit board.

18. The robot force sensor of claim 17, further comprising an associated plurality of indicators for said plurality of adjustable limit switches, each of said plurality of indicators being electrically connected to the circuit of said circuit board.

19. The robot force sensor of claim 18, wherein the circuit of said circuit board is electrically connected to a controller.

* * * * *